United States Patent
Bradford et al.

(10) Patent No.: US 9,672,818 B2
(45) Date of Patent: Jun. 6, 2017

(54) UPDATING POPULATION LANGUAGE MODELS BASED ON CHANGES MADE BY USER CLUSTERS

(71) Applicant: Nuance Communications, Inc., Burlington, MA (US)

(72) Inventors: Ethan R. Bradford, Seattle, WA (US); Simon Corston, Seattle, WA (US); David J. Kay, Seattle, WA (US); Donni McCray, Seattle, WA (US); Keith Trnka, Seattle, WA (US)

(73) Assignee: NUANCE COMMUNICATIONS, INC., Burlington, MA (US)

(*) Notice: Subject to any disclaimer, the term of this patent is extended or adjusted under 35 U.S.C. 154(b) by 285 days.

(21) Appl. No.: 13/869,919

(22) Filed: Apr. 24, 2013

(65) Prior Publication Data

US 2014/0316784 A1    Oct. 23, 2014

Related U.S. Application Data

(60) Provisional application No. 61/813,607, filed on Apr. 18, 2013.

(51) Int. Cl.
G10L 15/00    (2013.01)
G06F 17/27    (2006.01)
(Continued)

(52) U.S. Cl.
CPC ............................ *G10L 15/18* (2013.01)

(58) Field of Classification Search
CPC ...... G06F 3/0237; G06F 3/0233; G06F 17/27; G10L 15/22; G10L 15/00
(Continued)

(56) References Cited

U.S. PATENT DOCUMENTS 6,012,075 A    1/2000 Fein et al.
6,205,418 B1    3/2001 Li et al.
(Continued)

FOREIGN PATENT DOCUMENTS

EP    2020636 A1    2/2009
JP    2005031150 A    2/2005
(Continued)

OTHER PUBLICATIONS

International Search Report and Written Opinion for International Application No. PCT/US2014/034650, mailing date Aug. 26, 2014, 9 pages.
(Continued)

*Primary Examiner* — Pierre-Louis Desir
*Assistant Examiner* — Seong Ah A Shin
(74) *Attorney, Agent, or Firm* — Perkins Coie LLP

(57) ABSTRACT

Technology for improving the predictive accuracy of input word recognition on a device by dynamically updating the lexicon of recognized words based on the word choices made by similar users. The technology collects users' vocabulary choices (e.g., words that each user uses, or adds to or removes from a word recognition dictionary), associates users who make similar choices, aggregates related vocabulary choices, filters the words, and sends words identified as likely choices for that user to the user's device. Clusters may include, for example, users in a particular location (e.g., sets of people who use words such as "Puyallup," "Gloucester," or "Waiheke"), users with a particular professional or hobby vocabulary, or application-specific vocabulary (e.g., word choices in map searches or email messages).

21 Claims, 8 Drawing Sheets

(51) Int. Cl.
*G10L 15/22* (2006.01)
*G10L 15/18* (2013.01)

(58) Field of Classification Search
USPC ............... 704/235, 243, 245, 257, 275, 231
See application file for complete search history.

(56) References Cited

U.S. PATENT DOCUMENTS

| | | | |
|---|---|---|---|
| 6,484,136 B1 | 11/2002 | Kanevsky et al. | |
| 7,478,037 B2 | 1/2009 | Strong et al. | |
| 7,679,534 B2 | 3/2010 | Kay et al. | |
| 8,108,212 B2 | 1/2012 | Maegawa et al. | |
| 8,346,555 B2 | 1/2013 | Metz | |
| 8,515,752 B1 | 8/2013 | Franz et al. | |
| 8,543,384 B2 | 9/2013 | Kristensson et al. | |
| 8,650,031 B1 | 2/2014 | Mamou et al. | |
| 9,201,965 B1* | 12/2015 | Gannu | G06F 17/30867 |
| 2002/0188448 A1 | 12/2002 | Goodman et al. | |
| 2003/0046078 A1 | 3/2003 | Abrego et al. | |
| 2003/0171931 A1* | 9/2003 | Chang | G10L 15/07 |
| | | | 704/275 |
| 2003/0216913 A1 | 11/2003 | Keely et al. | |
| 2005/0165598 A1 | 7/2005 | Cote et al. | |
| 2005/0209844 A1 | 9/2005 | Wu et al. | |
| 2006/0247915 A1 | 11/2006 | Bradford et al. | |
| 2007/0083374 A1* | 4/2007 | Bates | G10L 15/197 |
| | | | 704/257 |
| 2007/0164782 A1* | 7/2007 | Church | G06F 17/276 |
| | | | 704/9 |
| 2007/0219779 A1 | 9/2007 | Kojima | |
| 2007/0276651 A1* | 11/2007 | Bliss | G10L 15/30 |
| | | | 704/9 |
| 2008/0167858 A1 | 7/2008 | Christie et al. | |
| 2008/0294982 A1 | 11/2008 | Leung et al. | |
| 2009/0058823 A1 | 3/2009 | Kocienda et al. | |
| 2009/0070097 A1 | 3/2009 | Wu et al. | |
| 2009/0144609 A1 | 6/2009 | Liang et al. | |
| 2010/0145677 A1 | 6/2010 | Shu et al. | |
| 2010/0241416 A1* | 9/2010 | Jiang | G06F 17/2827 |
| | | | 704/7 |
| 2010/0312555 A1* | 12/2010 | Plumpe | G10L 15/065 |
| | | | 704/231 |
| 2011/0029862 A1 | 2/2011 | Scott et al. | |
| 2011/0040657 A1* | 2/2011 | Roswell | G06F 17/3089 |
| | | | 705/27.1 |
| 2011/0093265 A1* | 4/2011 | Stent | G10L 15/06 |
| | | | 704/243 |
| 2011/0137653 A1 | 6/2011 | Ljolje et al. | |
| 2011/0137845 A1* | 6/2011 | Ward | G06Q 30/02 |
| | | | 706/50 |
| 2011/0231183 A1 | 9/2011 | Yamamoto et al. | |
| 2011/0296374 A1* | 12/2011 | Wu | G06F 17/2715 |
| | | | 717/104 |
| 2012/0029910 A1 | 2/2012 | Medlock et al. | |
| 2012/0262533 A1* | 10/2012 | Gannu | H04M 3/567 |
| | | | 348/14.07 |
| 2012/0271617 A1 | 10/2012 | Nakajima et al. | |
| 2013/0030804 A1 | 1/2013 | Zavaliagkos et al. | |
| 2013/0041857 A1* | 2/2013 | Medlock | G06F 17/276 |
| | | | 706/14 |
| 2013/0110511 A1* | 5/2013 | Spiegel | G10L 15/22 |
| | | | 704/243 |
| 2013/0198115 A1* | 8/2013 | Paek | G06F 3/04886 |
| | | | 706/12 |
| 2013/0246329 A1 | 9/2013 | Pasquero et al. | |
| 2013/0346434 A1 | 12/2013 | Shazeer et al. | |
| 2014/0108003 A1* | 4/2014 | Phillips | G06F 17/275 |
| | | | 704/8 |
| 2014/0108018 A1 | 4/2014 | Phillips et al. | |
| 2014/0201671 A1 | 7/2014 | Zhai et al. | |
| 2015/0067512 A1* | 3/2015 | Roswell | G06F 17/30769 |
| | | | 715/716 |
| 2015/0169537 A1 | 6/2015 | Corston et al. | |
| 2015/0309984 A1 | 10/2015 | Bradford et al. | |

FOREIGN PATENT DOCUMENTS

| | | |
|---|---|---|
| JP | 5259020 B2 | 8/2013 |
| KR | 1020110117449 A | 10/2011 |
| WO | 2013127060 A1 | 9/2013 |

OTHER PUBLICATIONS

Hernandez et al., "The effect of sample size and species characteristics on performance of different species distribution modeling methods," Ecography vol. 29, Issue 5, Oct. 24, 2006, pp. 773-785.
International Search Report and Written Opinion for International Application No. PCT/US2014/070043, mailing date Mar. 17, 2015, 15 pages.
International Search Report and Written Opinion for International Application No. PCT/US2015/025607, mailing date Jul. 31, 2015, 13 pages.

* cited by examiner

UPDATING POPULATION LANGUAGE MODELS BASED ON CHANGES MADE BY USER CLUSTERS

CROSS-REFERENCE TO RELATED APPLICATIONS

This application claims the benefit of U.S. Provisional Application No. 61/813,607, filed on Apr. 18, 2013, entitled "UPDATING POPULATION LANGUAGE MODELS BASED ON CHANGES MADE BY USER CLUSTERS," which is hereby incorporated by reference for all purposes in its entirety.

BACKGROUND

A wide variety of language recognition systems are designed to use one or more input modes. Typically, these input modes include a text input mode, speech input mode, and/or handwriting input mode. One of the fundamental objectives underlying these language recognition systems is to enable users to create text using one or more input modes with increased reliability at increased rates. The text input mode, for example, often allows increased input rates by enabling the user to perform actions with less precision than is required by comparable systems. In addition, this mode often provides a predictive completion feature that suggests word completion. The voice and handwriting input modes utilize a different set of input actions that some users may find easier and faster than typing. These inputs are then translated to text.

In general, language recognition systems rely upon local language models with a lexicon of textual objects that can be generated by the system based on the input actions performed by the user. In some cases, the devices running the language recognition system use the language models to map input actions performed by the user to one or more of these textual objects in the lexicon. These models are often dynamic and grow and learn as they are used, allowing a user to improve the baseline prediction with usage and teaching. However, since each user is different, these language models dynamically evolve in different ways based on each user's interactions. Users typically must train language models to recognize words that they actually want to input. Some products allow users to deliberately download supplementary word lists for use on their own devices.

In an ideal world, language models would contain all the words that users actually want to enter on an input device and none of the words that they do not want to enter. Unfortunately, language models often do not perfectly match users' language usage. With traditional language recognition systems, a user's device or devices would need to individually learn or develop a customized local language model based on user inputs. Moreover, a number of variables affect the accuracy with which these language recognition systems recognize and map the inputs to the textual objects. Prominent among these factors is whether the textual object resides within the lexicon and the frequency of use of the textual object. For example, if a word is not frequently used, a text input system might misrecognize the word, favoring one that is statistically more likely to be utilized. Among the words that are commonly misrecognized are proper names, such as those for people, streets, restaurants, and other words that have a special relevance in personal messages like voicemails. As a result, the language model for any one user's device(s) may have a less than desirable response because the language model, even if trained with all of the user's previous inputs, may not include additional vocabulary relevant to the user and the input context.

BRIEF DESCRIPTION OF THE DRAWINGS

Embodiments of the present disclosure will be described and explained through the use of the accompanying drawings in which.

DETAILED DESCRIPTION

Figure 1:
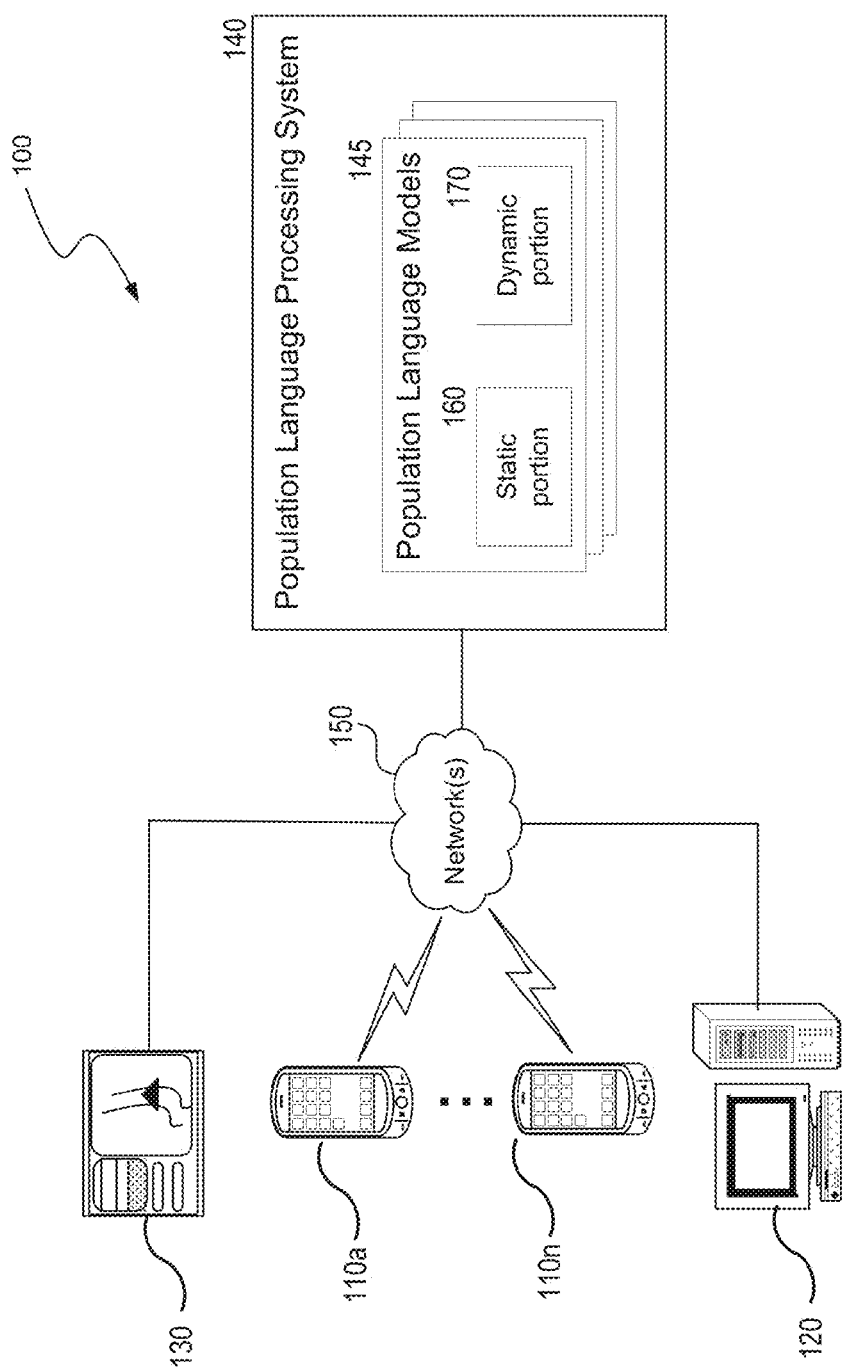
FIG. 1 illustrates an example of a computing environment in which a population language processing system may be utilized in conjunction with local language processing systems on user devices.

Users of computing devices having language recognition systems typically make changes to local language models that are used by the language recognition systems. A language model contains various information to help the language recognition system in recognizing or producing language, including, but not limited to, lists of individual words (unigrams) and their relative frequencies of use, and the frequencies of word pairs (bigrams), triplets (trigrams), and higher-order n-grams. User changes to a local language model include word additions, word deletions, changing frequencies of using words or n-grams, responses to word suggestions, changes in word priorities, and other events tracked in the local language model ("events.") A language processing system is disclosed herein that collects the user's local language models' events and identifies changes to population language models (including generation of new population language models) based on clusters of users sharing similar characteristics. That is, on a continuous or periodic basis the system collects user events in their respective local language models. The system may also collect other information about the user and/or mobile device, including the location of the mobile device, interests of the user, applications typically used by the user, etc. After collection of event data from users, the system processes the collected data in order to identify clusters of users sharing similar characteristics, such as common events, current location, earlier location, interests, applications, device uses, etc. The clusters of users are used to either create new population language models or to generate recommended changes to existing population language models that are associated with the clusters. The system selectively provides the identified population language model changes to users. The population language model changes may be provided, for example, to other users that fall within the cluster of users from which the event data was received or to new users that are identified as falling within the cluster. Maintaining a population language model associated with a cluster of users allows the system to take advantage of word usage patterns and commonalities between users or between clusters of users.

It will be appreciated that by associating a user with a cluster of users who employ similar language or characteristics—e.g., users who add the same words (or n-grams) to their local language models or who reside in the same region—the system can provide changes to the local language model for the user that immediately improves the operation and value of the user's language recognition system. Modifying the local language model to include words the user is likely to use allows for more efficient text input, including more words the user wants to use, and avoids the clutter of words the user does not want. Thus, without requiring a user to perform any explicit action, the user's lexical and grammatical choices are contributed to the population language models and the user benefits from the contributions of others.

In some embodiments, local language model events and other user and device information and/or updates may be irregularly provided to or received from the system. Under some situations (e.g., due to connection type or heavy usage), it may be impractical to consistently upload events and other information on a local device to population language models and download population model changes—e.g., updates from relevant population language models, or a new population model—to the local device. Various embodiments provide the ability to selectively deliver some events and other information to the population language models and receive local language model updates in real-time (or near real-time) in order to improve immediate prediction. In at least one embodiment, a messaging system can be used to prioritize when to distribute events to local devices. For example, the messaging system can determine which events and other information are of high importance (e.g., a location trigger) and immediately send high-importance events and other information to the population language models. The messaging system can utilize a real-time (or near real-time) message bus between clients and a server or set of servers, enabling the ability to send language model events and other information and receive language model updates to enhance the input experience for a user.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or another type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present disclosure, and may be included in more than one implementation. In addition, such phrases do not necessarily refer to the same embodiments or different embodiments.

FIG. 1 illustrates an example of a computing environment 100 in which a population language processing system may be utilized. As illustrated in FIG. 1, a language recognition system may operate on various computing devices, such as mobile devices 110a-n (such as a mobile phone, tablet computer, mobile media device, mobile gaming device, etc.), computers 120, and other devices capable of receiving user inputs (e.g., such as navigation system 130 or vehicle-based computer). Each of these devices can include various input mechanisms (e.g., microphones, keypads, and/or touch screens) to receive user interactions (e.g., voice, text, and/or handwriting inputs). Each language recognition system on these devices can be utilizing a local language model. Each device may have a different end user.

Users of computing devices having language recognition systems typically make changes to local language models that are used by the language recognition systems. The changes include word additions (including added n-grams), word deletions, changes in word priorities, and other events. For example, users may choose to remove words or n-grams because they are obscure, technical, misspelled, offensive, or because they frequently appear in lists of candidate words or n-grams when some other word or n-gram is actually intended. Events can include, e.g., information about a user's vocabulary choices in various contexts. As illustrated in FIG. 1, mobile devices 110a-n and computers 120 can communicate with a population language processing system 140 through one or more wired or wireless, public or private, networks 150. As will be described herein, user events in local language models are communicated to the population language processing system 140. In addition, information about the user (e.g., the interests of the user) or the mobile device (e.g., the location of the mobile device) may be communicated to the population language processing system 140. The information about the user may include express or implied interests of the user. Information about the mobile device may include the current and/or past location of the mobile device, the applications typically used on the mobile device, characteristics of the mobile device (e.g., available memory), etc.

The population language processing system 140 builds one or more population language models 145 taking account the events received from multiple language models that are running locally on the mobile devices. As a result, each population language model 145 is an aggregate model based on data that describes multiple end user interactions with the corresponding device of the end user. A population language model may include, for example, information about words added to, deleted from, and corrected in each end user's local language models. The population model is constructed based on event data or based on event data and additional received information, such as information about the context of user vocabulary choices and the location of each device.

In accordance with various embodiments, each population language model 145 may include a static language portion 160 and a dynamic portion 170. Static portion 160 is an initial word list (including n-grams) generated by, for example, the system operator for a population language model based on general language use. In contrast, dynamic portion 170 is based on events (e.g., add a word, delete a word, word corrections, n-gram usage, and word count) from each device associated with an end user. The system identifies clusters of users sharing similar characteristics, such as current location, earlier location, interests, applications, device uses, etc., and/or similar language model events. The clusters of users are used to either create new population language models or to generate recommended changes to existing population language models that are associated with the clusters. Events are typically processed in the order that they occurred in order to update the dynamic portion 170 in real-time or near real-time. However, in some embodiments, events can be processed out of order to update the dynamic portion. For example, more important events may be prioritized for processing before less important events.

The population language processing system 140 selectively provides identified population language model changes 170 to user computing devices. The population language model changes may be provided, for example, to other users that fall within the cluster of users from which the event data was received or to new users that are identified as falling within the cluster. Modifying the local language model to include words (including n-grams) the user is likely to use allows for more efficient text input, including more words the user wants to use, and avoids the clutter of words the user does not want.

Figure 2:
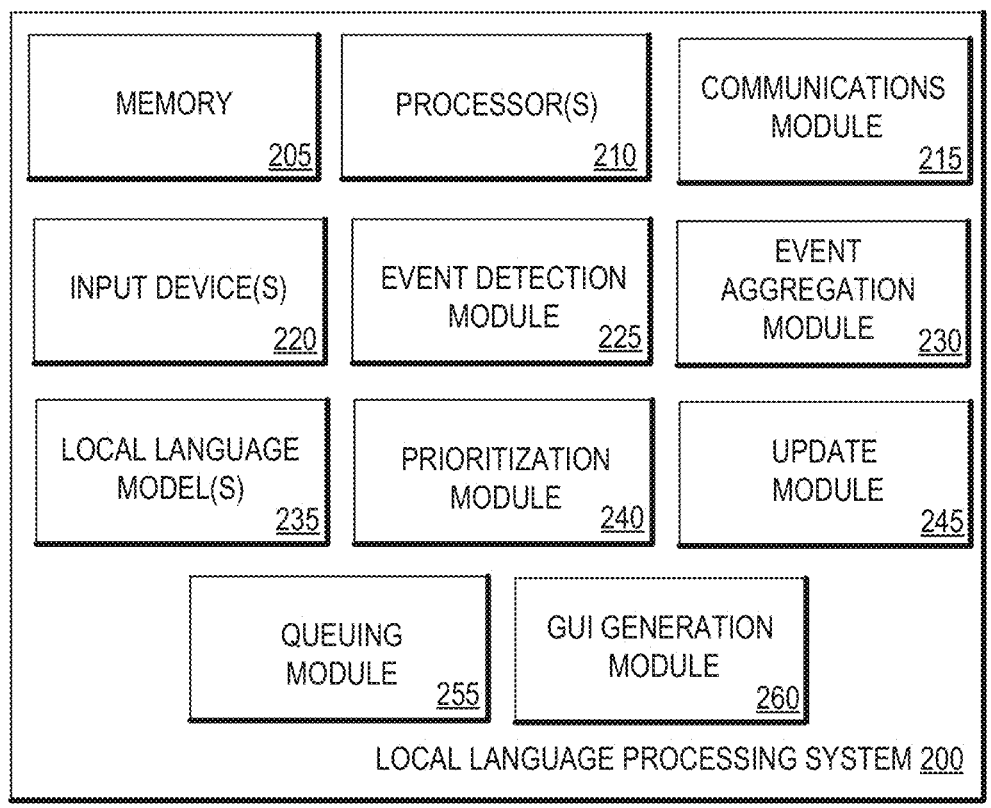
FIG. 2 illustrates a set of components for a local language processing system.

FIG. 2 illustrates a set of components for a local language processing system 200. According to the embodiments shown in FIG. 2, local language processing system 200 includes memory 205, one or more processors 210, communications module 215, input devices 220, event detection module 225, event aggregation module 230, local language models 235, prioritization module 240, update module 245, queuing module 255, and graphical user interface (GUI) generation module 260. Other embodiments of the system may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, prioritization module 240 and queuing module 255 can be combined into a single module for prioritizing event data transfers.

Memory 205 can be any device, mechanism, or populated data structure used for storing information. In accordance with some embodiments of the present system, memory 205 can encompass any type of, but is not limited to, volatile memory, nonvolatile memory, and dynamic memory. For example, memory 205 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 205 may include one or more solid-state drives, disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processors 210. For example, memory 205 could be used in one or more embodiments to house all or some of the instructions needed to execute the functionality of event detection module 225, event aggregation module 230, local language models 235, prioritization module 240, update module 245, queuing module 255, and/or GUI generation module 260.

Event detection module 225 can use one or more input devices 220 (e.g., keyboard, touchscreen, microphone, or GPS sensor) to detect one or more events associated with local language models running on each computing device 110-130. Events arise as a result of a user's interaction with a language processing system on a local device. An event can be used to modify the local language model. Some events may have a large impact on the local language model (e.g., when adding a word or n-gram), while other events may have little to no effect (e.g., using a word that already has a high frequency count). Events can include data points that can be used by the system to process changes that modify the language model. Examples of events that can be detected include new word events, delete word events, mark use events, mark nonuse events, adjust quality events, changed frequency of use events, delete language events, new word pair events, new n-gram events, and many other events that can be used for developing all or a portion of a population language model. In addition to events, additional data may be collected and transmitted in conjunction with the events. Such additional data may include location information (e.g., information derived via GPS or cell tower data, user-set location, time zone, and/or currency format), information about the language(s) used in a locale (e.g., for determining dialects of language usage), and context information that describes applications used by the user in conjunction with the language processing system. The additional data may be derived from the user's interaction with the local device.

In some cases, event aggregation module 230 can aggregate or categorize the events and other information into a single grouping to allow communications module 250 to push the events and information to the population language processing system 140. In some embodiments, local language model events can be grouped as a category (e.g., based on the context in which the events occurred), and different weights applied to each category depending on the importance of the category. The ability to assign different weights to each category, for example, allows the impact of the events on the population language models to be adjusted.

One or more local language models 235 are associated with each device to locally process the user's inputs. These local language models incorporate events detected with the associated device and may include additional information about users and/or devices such as that described in connection with event detection module 225 above. In some cases, the models may also access any local contact lists, local email, local SMS/MMS texts, and other local text-based communications for developing the local language model.

Prioritization module 240 prioritizes the events and other information detected by event detection module 225. In some embodiments, the prioritization may be based on local contextual information such as network connections, current usage rates, power levels, or user preferences.

Using information about the detected events and other information about users and/or devices and the priority of these detected events and other information, update module 245 can send the events individually, or in the aggregate, to population language processing system 140. Update module 245 also handles update instructions and data from population language processing system 140. For example, update module 245 handles instructions to remove words likely to be a nuisance to the user from the local language models and data including additional words or n-grams likely to be useful to the user to the local language models.

Communications module 215 sends and receives any updates to and from population language processing system 140. In some embodiments, communications module 250 monitors the current connection type (e.g., cellular or Wi-Fi) and can make a determination as to whether updates and events should be pushed or pulled. For example, if communications module 250 determines that a cellular connection is currently being used then any outgoing messages can be queued using queuing module 255. In addition to the current connection type, communications module 250 may use other information such as event priority and/or user preferences when determining whether to push or pull data.

GUI generation module 260 generates one or more GUI screens that allow for interaction with a user of the language processing system. In at least one embodiment, GUI generation module 260 generates a graphical user interface allowing a user of the computing devices to set preferences, run training applications for training the language processing system, set device constraints, select temporary population language model additions, and/or otherwise receive or convey information between the user and the device.

Figure 3:
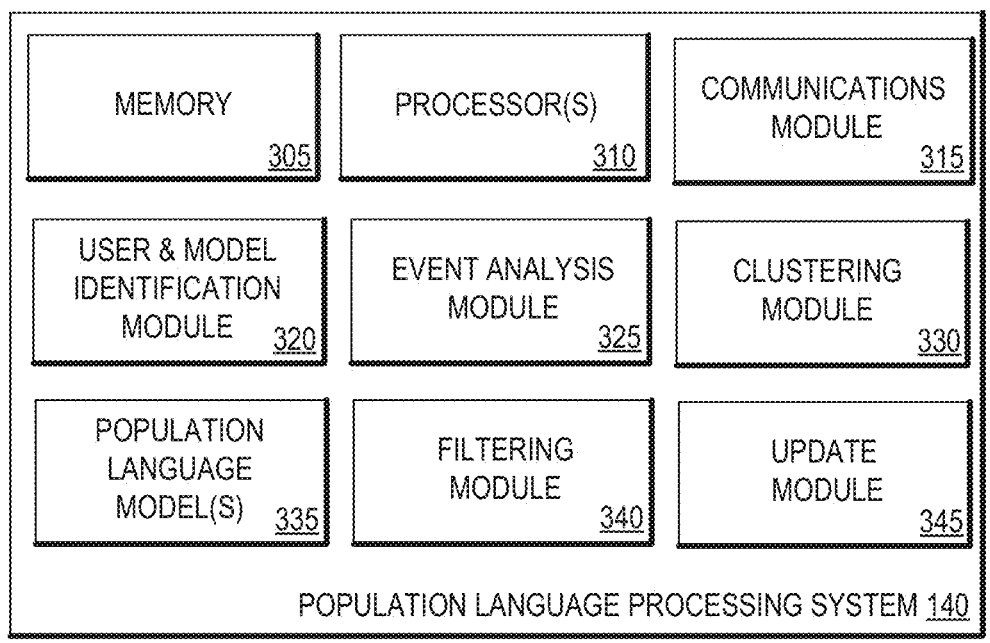
FIG. 3 illustrates a set of components for a population language processing system.

FIG. 3 illustrates a set of components for a population language processing system 140. According to the embodiments shown in FIG. 3, population language processing system 140 can include memory 305, one or more processors 310, communications module 315, user and local model identification module 320, event analysis module 325, clustering module 330, population language models 335, filtering module 340, and update module 345. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above with reference to memory 205. Memory 305 may be used to store instructions for running one or more applications or modules on processors 310. For example, memory 305 could be used in one or more embodiments to house all or some of the instructions needed to execute the functionality of user and local model identification module 320, event analysis module 325, clustering module 330, population language models 335, filtering module 340, and update module 345. The communications module 315 is configured to allow the population language processing system 140 to communicate with mobile devices.

User and local model identification module 320 is configured to identify a user. A variety of methods may be used to identify the user such as, but not limited to, log in credentials, telecommunication device identifiers, voice identification, visual recognition, and/or other techniques for identifying users. The same or different identification methods may be used at each device to identify the user when the user accesses the language processing system. Each user may be associated with one or more devices that have local language models. User and local model identification module 320 can be used to track the current state of each local language model.

As events and additional information about users and/or devices are received from various users' local language models, event analysis module 325 determines how the events and additional information should be processed and applied to the population language models 335. In some embodiments, events and additional information can be tracked using a change log in a SQL database. In other embodiments, the events and additional information are stored in an on disk change log. In addition to the events received from the local devices, other off-board personal data, such as website data, social networking data, social networking friend data (such as communications with friends), information from personal computing devices, data from Internet accessible documents (e.g., Google docs), and others may be utilized in creating new population language models or expanding existing population language models.

Clustering module 330 uses events and additional information about users and/or devices to identify clusters of changes that are to be made to the local language models. The clustering may be based on the location of users, common characteristics of users (e.g., likes, dislikes, applications used, demographic characteristics), similarity between words used, or other factors. Clustering module 330 can associate a word or n-gram with one or more clusters. Clustering module 330 can also associate a user or local language model with one or more clusters. Associations may be derived anonymously, e.g., by statistical frequency analysis and word association analysis. For example, inferential analysis may determine that users who use, e.g., particular medical terms such as "scapula" and "ulna" also tend to use "humerus." Vocabulary clusters may be created algorithmically and as a result may not be identifiable as easily recognizable categories of related terms or easily definable clusters of users. Clustering module 330 may also use a data scraping analysis to associate word clusters using one or more explicit databases of related words and n-grams.

Filtering module 340 allows the population language processing system 140 to analyze the clusters of events and determine what changes should be applied to a population language model and what changes should not be applied to the population language model. The filtering module removes unwanted or unwarranted changes. For example, typos, misspellings, and nonstandard capitalization, even where common (e.g., "teh"), can be filtered out by filtering module 340 to avoid sending unwanted entries to users' local language models. Similarly, filtering module 340 can generally or selectively filter profanity, e.g., to avoid updating a user's local language model(s) with words or n-grams more offensive than (or of a different type from) those typically used by that user. Filtering module 340 can halt the removal of certain words from local language models, e.g., to ensure that core vocabulary words are not improperly deleted.

Update module 345 determines the timing and extent to which new population language models or updates to existing population language models are sent to user computing devices. As will be described in additional detail herein, the update module 345 may continuously provide updates to computing devices, may send updates in batches, may send updates when requested by a user, or may send updates when needed by the user (e.g., when a user accesses a particular existing population model). The update module 345 may also determine when all or portions of a population language model should be deleted or removed from a user's computing device.

Figure 4:
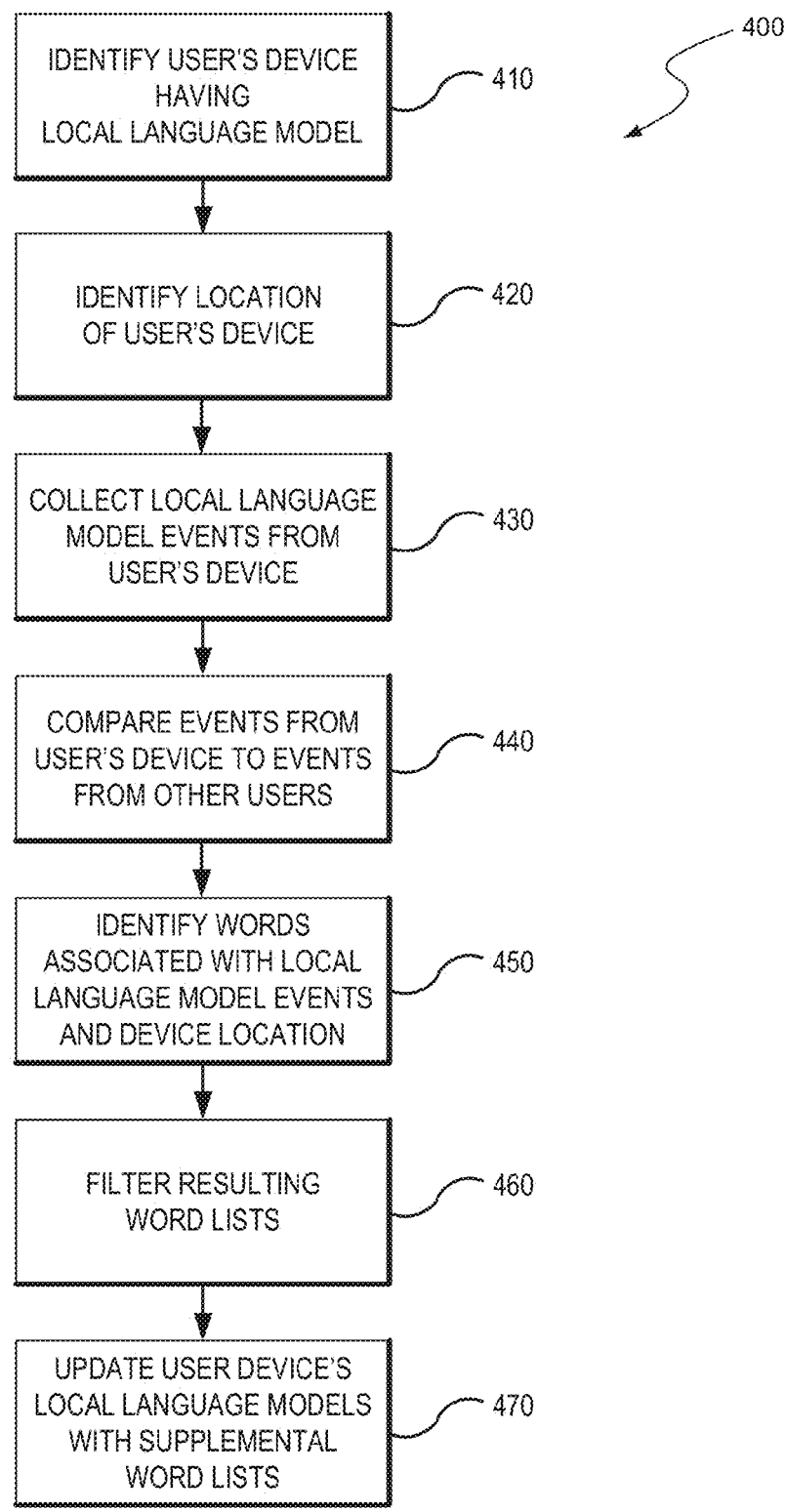
FIG. 4 is a flowchart illustrating a set of operations for updating local language models based on analysis of other users' language models.

FIG. 4 is a flowchart illustrating a set of operations 400 for updating local language models based on analysis of other users' devices' language models. The operations illustrated in FIG. 4 may be performed by one or more components (e.g., processor 310) and/or modules (e.g., clustering module 330 or update module 345). Identification operation 410 identifies a user and an associated device that has one or more local language models. Location operation 420 identifies the geographic location of the device identified in identification operation 410. Location data may be only general enough to specify the country in which the device is located (e.g., to distinguish a user in New Zealand from a user in the United States) or may be specific enough to indicate the user's presence at a particular event (e.g., within a stadium during or near the time of a football game). Location data may also include information about changes of location (e.g., arrival in a different city or country). Location data may be obtained from the user's device—a GPS location fix, for example—or from locale information set by the user.

Collection operation 430 obtains events and other information about the users and/or devices recorded in the local language models identified in identification operation 410. The events are provided to a population language processing system (e.g., FIG. 1 block 140) typically maintained in a cloud-based environment or other distributed server-client system. Collection operation 430 records any changes to the local language model based on events such as new words or n-grams, removed words or n-grams, and word/n-gram weights received from the identified user device.

Comparison operation 440 compares the events and additional information from the identified user device with data collected from other devices and other users. In some embodiments, comparison operation 440 considers the contexts of various local language model events, e.g., a user's differing vocabulary in different applications or uses such as Web search boxes, email prose, and map application searching; as well as indicia such as the size of the vocabulary used by a user and the user's respective propensity to profanity. In some embodiments, comparison operation 440 identifies local language model events from other users and/or devices that are similar to or in common with the collected local language model events from the identified user's device. For example, comparison operation 440 may identify local language model events such as use of the word "bigram" or the addition of "n-gram" to local language models. Comparison operation 440 may also identify language model events in similar contexts including location. For example, upon the user arriving in a new city or country, comparison operation 440 may identify events of other users who have previously or recently arrived in the same location, e.g., searches by the user and by other users for local hotel names.

Association operation 450 identifies additional words, n-grams, and/or language model events (e.g., deletion of an unwanted word) that may be associated with the identified user's device's local language model events and additional information such as the location of the device. Association operation 450 may identify a cluster of users who use related vocabulary, e.g., a cluster including a user who uses the word "bigram", a user who uses the word "trigram", and a user who has added "n-gram" to a local language model. Association operation 450 can then associate each of those users with an existing population language model for the cluster, or if one does not exist, create a new population language model for the cluster. In some embodiments, cluster associations are binary (in or out). In some embodiments, based on the results of comparison operation 440, association operation 450 forms clusters (of words or n-grams, language model events, device local language models, and/or users) that have some non-binary strength or degree of association. The identified user's device's local language model events and additional information may be associated with a number of different clusters of varying sizes (measured in, e.g., number of associated words or n-grams, or number of clustered users) and varying strengths of association. In some embodiments, results of former association operations 450 are reevaluated based on the user's evolving vocabulary use in the device's local language model with respect to each population language model. A user may be removed from a cluster if the user does not continue using language associated with the cluster. In some embodiments, if the number of users or language model events associated with a population language model falls below a threshold, the population language model may be deleted. Association operation 450 can also associate language with location information, e.g., a population language model including team names and player names used by other users at the same sports event as the identified user, or a population language model including hotel and restaurant names for a cluster associating travelers arriving at a new destination. In some embodiments, users may select one or more predefined or self-generated categories for self-identifying with clusters and associated population language models.

In some embodiments, population language models or language databases used by association operation 450 include sets of words (including n-grams) marked as likely to be used as a set. Thus, when one or more words from that set are used, all the words in the set are increased in prominence; and when a word from the set is rejected, all the words in the set are reduced in prominence. For example, legal or medical terms may be found in specialized dictionaries. Some sets may be antagonistic, e.g., American spellings (neighbor, criticize, theater) and British spellings (neighbour, criticise, theatre); using words in one set can cause the words in the antagonistic set to be discounted. Thus, association operation 450 would be less likely to associate a population language model including British spellings with a cluster of users who exclusively use American spellings.

Filtering operation 460 excludes some unwanted changes from potential updates to the user's local language models. For example, filtering operation 460 may include a blacklist of, e.g., misspellings (including capitalization and diacritical mark errors) and profanity, and a whitelist of basic vocabulary not to be deleted (e.g., the top five percent of commonly used words). Filtering operation 460 may also exclude other users' dialects (e.g., characteristic turns of phrase), as well as out-of-language words when other languages are spoken by a user. In some embodiments, filtering operation 460 includes having native speakers review lists of words or n-grams.

In addition, before sending words or n-grams to a user for potential use in text suggestions, filtering operation 460 may require words to have a threshold user count (e.g., at least a certain number or percentage of people using a given word or n-gram) and/or a threshold frequency of use (e.g., at least a certain number of times that the word or n-gram is used by each person who uses it, or a threshold for overall popularity of the word or n-gram by usage), to protect other users' privacy and avoid promulgating idiosyncratic uses.

In some embodiments, filtering operation 460 limits the overall size of the updates that may be sent to the user's device. Filtering criteria may include, e.g., a fixed number of words or n-grams, a maximum amount of data, a percentage of available or overall capacity for local language model data on the device, the number of words or n-grams required to obtain an accuracy rate better than a target miss rate (e.g., fewer than 1.5% of input words requiring correction), or any words or n-grams used at least a threshold number of times. In some embodiments, words or n-grams that are unused by most users and explicitly removed by a significant proportion of users who remove any words or n-grams from their local language models may be deleted from associated population language models. In some embodiments, a user may opt to modify filtering of the words to be added to the user's local language model on various criteria, e.g., whether to allow current slang, whether to accept various degrees of profanity, or how much free space to allocate to the local language model.

In update operation 470, the local language model on the user's device is updated with the filtered list of supplemental words and/or n-grams and local language model changes including added, removed, and/or changed population language models. The end result is a better experience because crowd-sourced vocabulary identified as relevant to the user's input improves the likelihood that the user will receive better word recognition predictions.

Figure 5:
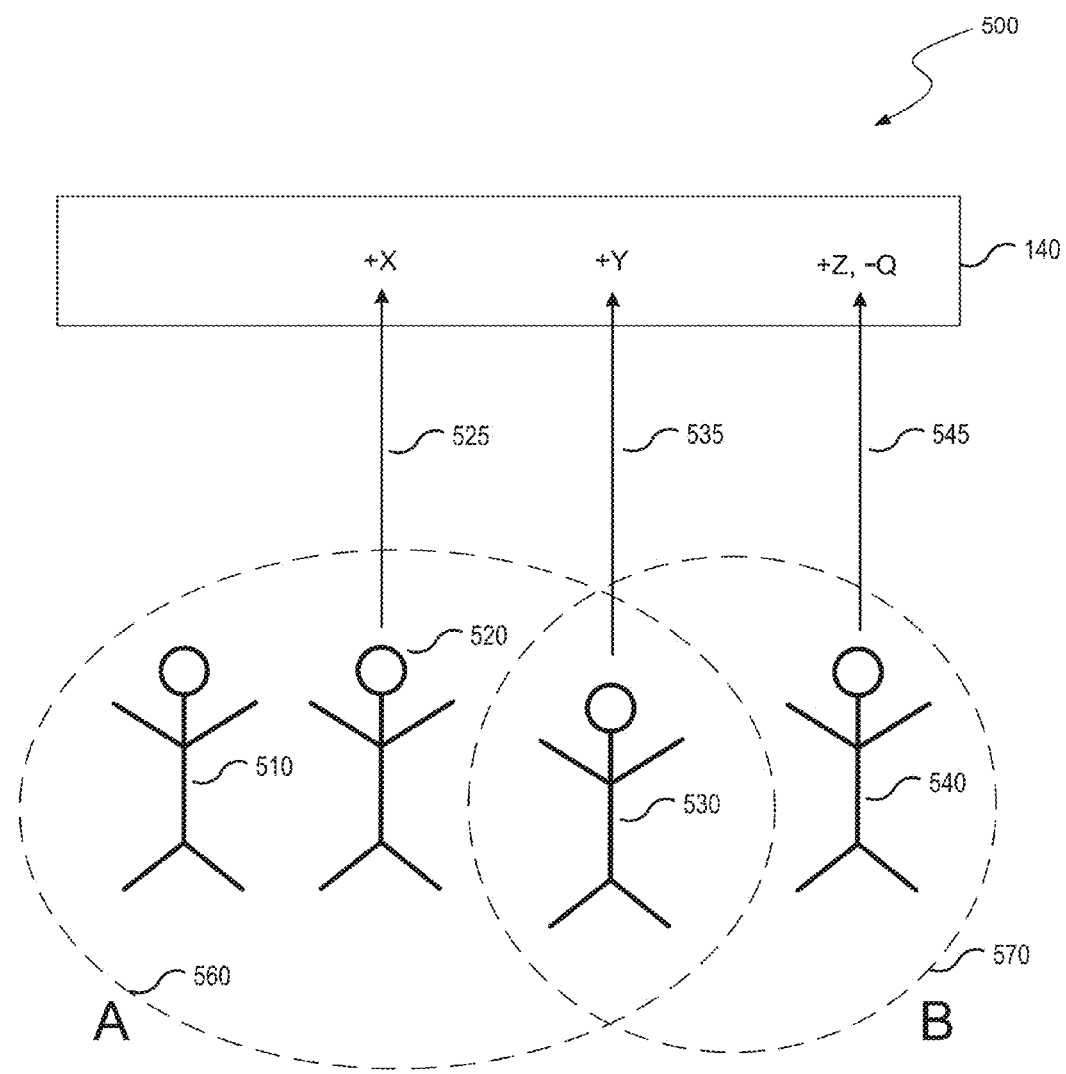
FIG. 5 is a diagram illustrating local language model events received by the population language processing system.

FIG. 5 is a diagram illustrating local language model events received by the population language processing system 140. Users 510, 520, 530, and 540 use devices having local language models. Language model events may be associated with a single device or with a master language model for more than one device. User 510 does not have any local language model events, but users 520, 530, and 540 do have events on their devices, each of which, at some point, is sent to population language processing system 140. Specifically, the events are user 520 adding word X, 525; user 530 adding word Y, 535; and user 540 adding word Z and deleting word Q, 545. As illustrated, users 510, 520, and 530 are clustered in cluster A 560, and users 530 and 540 are clustered in cluster B 570, with a population language model for each cluster.

Figure 6:
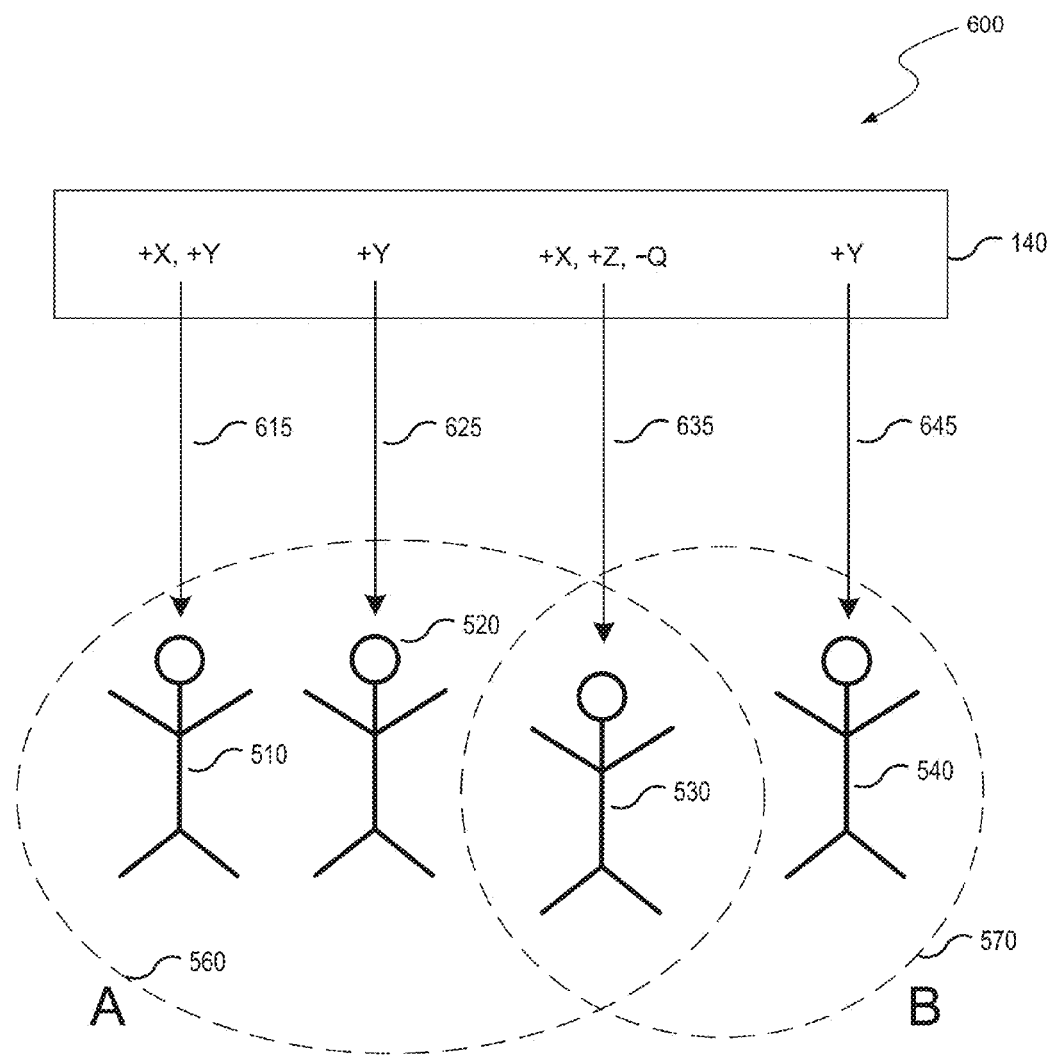
FIG. 6 is a diagram illustrating local language model updates from the population language processing system.

Continuing from FIG. 5, FIG. 6 is a diagram illustrating local language model updates from the population language processing system 140. Illustrated in FIG. 6 as in FIG. 5 are users 510-540, clusters A 560 and B 570, and population language processing system 140. In the illustrated embodiment, population language processing system 140 updates user 510's local language model by adding words X and Y 615. The update 615 occurs because in FIG. 5 user 520 added word X, 525, and user 530 added word Y, 535, and as illustrated by cluster A 560, users 510, 520, and 530 are associated by a common population language model (e.g., as a result of those users' previous word use patterns or local language model events). Similarly, then, population language processing system 140 updates user 520's local language model by adding word Y, 625, and updates user 530's local language model by adding word X, 635. After the update, users 510, 520, and 530 each have words X and Y in their local language model, and their devices can display those words as candidates when those users input text.

In addition, because user 530 is also a member of cluster B 570 (together with user 540), user 530 receives the addition of word Z and deletion of word Q 635 according to the language model events transmitted to the population language processing system 140 as illustrated in FIG. 5 at 545. Likewise, user 540 receives an update with the addition of word Y 645. After the update, both users 530 and 540 have words Y and Z (but not Q) in their local language models; but only user 530 has word X, which is not associated with cluster B 570 and its population language model.

Consider the following dynamic language learning example: suppose a user has a phone or tablet with the latest version of the language processing system that has the ability to update a local language model of word suggestions in real time. The user is writing an email to some friends about his favorite show, Battlestar Galactica. "Battlestar" is not part of the user's local (or master) language model and thus the user has to type it in completely, along with the unrecognized word "Galactica." The system detects the add word event and identifies other words or n-grams often associated with "Battlestar Galactica" (and, e.g., word usage patterns typical of other users who use "Battlestar Galactica.") The system updates the user's local language model(s) with the associated data. After the user finishes the email, he receives a reply from a friend wanting to know where he can watch Battlestar Galactica. The user begins writing a response and when he begins typing the channel name "SyFy" he notices that the system predicts it, removing his need to type it in.

Figure 7:
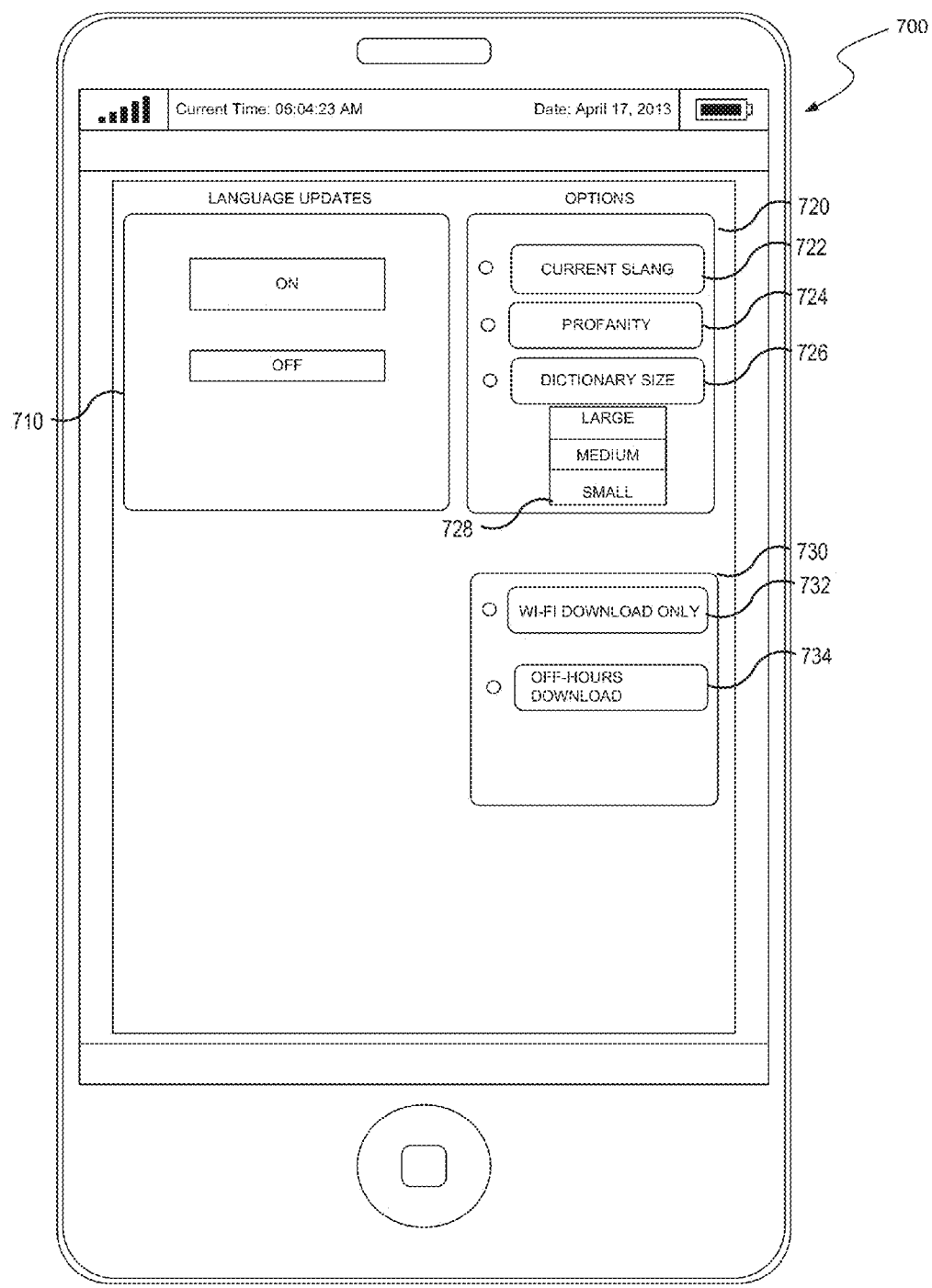
FIG. 7 is a screenshot of a representative graphical user interface that allows a user to manage illustrative preferences for a user's mobile device.

Various embodiments allow for different mechanisms for the management of user preferences regarding dynamic language updates. For example, in some cases, the end user can manage preferences either in the application or through a web based system. FIG. 7 is a screenshot of a representative graphical user interface 700 that is generated by the GUI generation module 260 that allows a user to manage illustrative preferences for a user's mobile device. The user interface 700 includes various radio buttons and fields that allow a user to modify settings associated with automatically updating a local language model. For example, in a region 710 the user may be presented the ability to choose to enable or turn off automatic language model updates.

In a region 720, the user may define various optional settings associated with language model updates. Radio button 722 allows a user to select whether the system should allow or filter out suggestions of current slang, and radio button 724 allows a user to make the same decision for profanity. Radio button 726 allows a user to specify how much free space the local language model may be allowed to take up, using an associated drop-down menu 728. In some embodiments (not shown), the user interface 700 enables a user to elect a population language model to add to the device's local language model (e.g., based on a label or a search term associated with a population language model), or to select a population language model to remove from the device's local language model. For example, if a user is planning a trip, the user may wish to update the device's local language model in advance.

In a region 730, the user may define various network or device settings that apply to the language model updates. For example, radio button 732 allows a user to specify that all updates should only be downloaded when the user's mobile device is connected to a Wi-Fi or other low-cost network connection. Radio button 734 allows a user to specify that all updates should occur between certain hours when the user is unlikely to be using their mobile device.

Exemplary Computer System Overview

Figure 8:
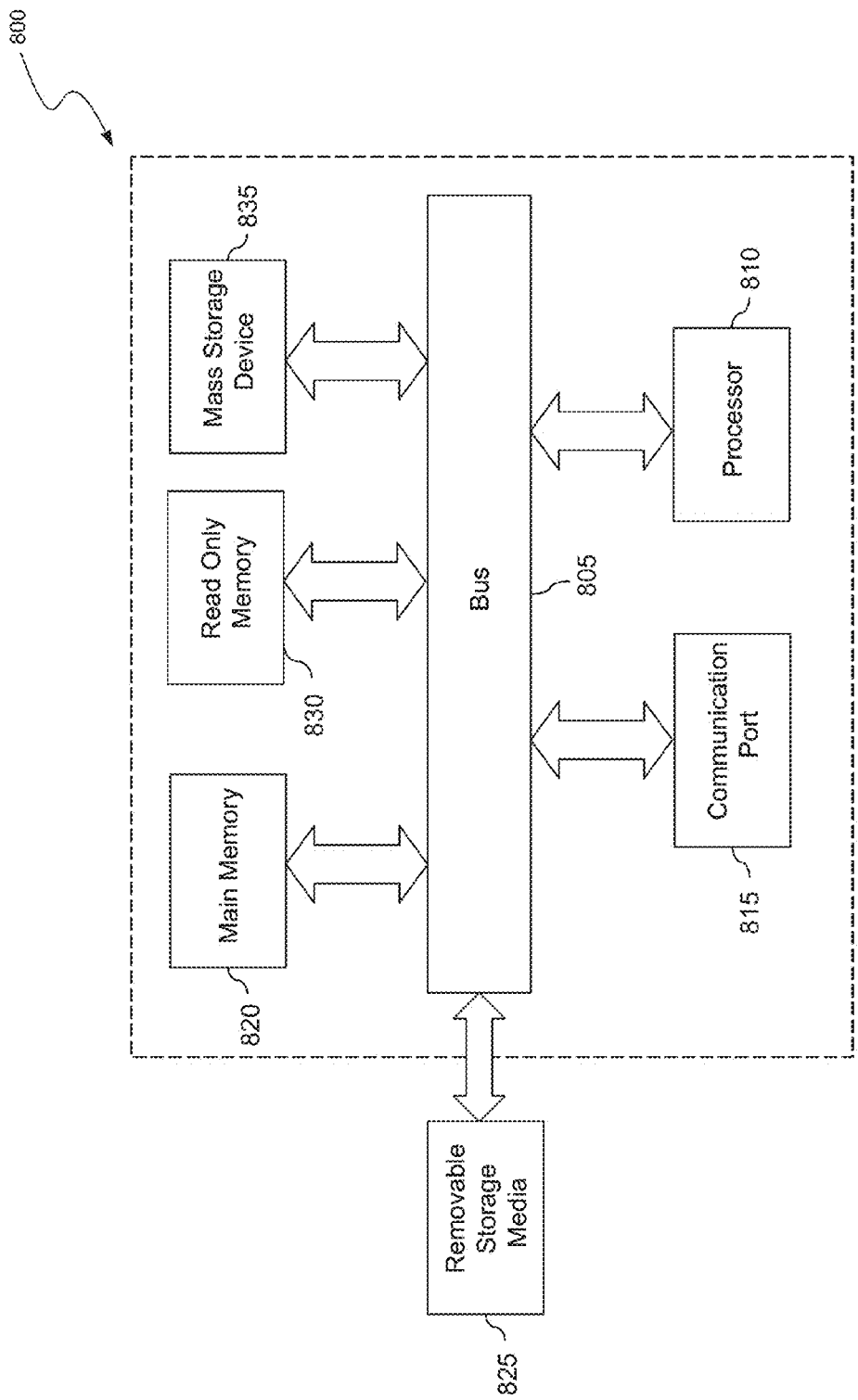
FIG. 8 is an example of a computer system with which the population language processing system may be utilized.

Embodiments of the present disclosure include various steps and operations described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which the population language processing system may be utilized. According to the present example, the computer system includes a bus 805, at least one processor 810, at least one communication port 815, a main memory 820, removable storage media 825, a read only memory 830, and mass storage 835.

Processor(s) 810 can be any known processor, such as, but not limited to, one or more x86-64 processors (e.g., Intel® Atom™ or Intel® Core™ i7) or ARM® family processors (e.g., Cortex®-A7 or Cortex®-A15), or graphics processing units (GPUs). Communication port(s) 815 can be, e.g., a micro-USB port, a gigabit Ethernet port using copper or optical fiber, or a wireless interface port (e.g., Wi-Fi, Bluetooth®, or cellular). Communication port(s) 815 may be chosen depending on a network such a Local Area Network (LAN), Wide Area Network (WAN), or any network to which the computer system 800 connects.

Main memory 820 can be Random Access Memory (RAM), or any other dynamic storage device(s) commonly known in the art. Read only memory 830 can be any static storage device(s), such as Programmable Read Only Memory (PROM) chips for storing static information such as instructions for processor 810.

Mass storage 835 can be used to store information and instructions. For example, solid state drives, hard disks such as SCSI, SATA, or Fibre Channel-interface drives, an optical disc, an array of disks such as RAID, or any other mass storage devices may be used.

Bus 805 communicatively couples processor(s) 810 with the other memory, storage, and communication blocks. Bus 805 can be, e.g., a PCIe, HyperTransport, InfiniBand, USB, or eSATA based system bus depending on the storage devices used.

Removable storage media 825 can be any kind of external flash memory drives, solid state storage cards, hard drives, floppy drives, Compact Disc-Read Only Memory (CD-ROM), Compact Disc-Re-Writable (CD-RW), Digital Video Disk-Read Only Memory (DVD-ROM), et al.

The components described above are meant to exemplify some types of possibilities. In no way should the aforementioned examples limit the scope of the disclosure, as they are only exemplary embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various examples described above can be combined to provide further implementations of the disclosure. Some alternative implementations of the disclosure may include not only additional elements to those implementations noted above, but also may include fewer elements.

These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates the various aspects of the disclosure in any number of claim forms. For example, while only one aspect of the disclosure is recited as a computer-readable medium claim, other aspects may likewise be embodied as a computer-readable medium claim, or in other forms, such as being embodied in a means-plus-function claim. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. A method in a computing system of selectively updating population language models used by language recognition systems, the method comprising:
receiving events for representing user changes to local language models,
wherein the events are received from devices of a plurality of users;
receiving information characterizing the plurality of users,
wherein the information includes social-networking friend data for the users;
identifying, from the received information, a user cluster based on the social-networking friend data,
wherein the user cluster is for representing a subset of users sharing matching or associated instances of the social-networking friend data, and
wherein the identifying is performed by a hardware processor;
generating or updating a population language model for the user cluster, wherein the generating or updating of the population language model includes:
identifying a subset of the events associated with the user cluster for initiating the generation or update of the population language model, and
filtering the events by excluding events associated with a blacklist of vocabulary not to be added or events associated with a whitelist of vocabulary not to be deleted;
aggregating the user changes and associated words corresponding to the subset of the events; and
providing the population language model or updates thereof to a computing device of one or more users in the user cluster for subsequently recognizing input information provided to the computing device by the one or more users in the user cluster.

2. The method of claim 1, wherein receiving events associated with local language models comprises receiving information about responses to word suggestions, addition of words to the local language model, or deletion of words from the local language model.

3. The method of claim 2, wherein information about word usage includes frequencies of use of individual words, word pairs (bigrams), triplets (trigrams), or higher-order n-grams.

4. The method of claim 2, wherein the events are received on a continuous, periodic, or irregular basis.

5. The method of claim 1, wherein the users in the cluster share a location.

6. The method of claim 1, wherein the users in the cluster share a common interest.

7. The method of claim 1, wherein identifying a cluster of users sharing similar characteristics further comprises identifying similar events associated with local language models.

8. The method of claim 7, wherein identifying similar events comprises determining word or n-gram associations.

9. The method of claim 1, wherein generating or updating the population language model includes generating or updating the population language model based on other words connected to or inferred from the words corresponding to the subset of the events, wherein the other words are determined based on word-association for the words corresponding to the subset of the events or based on an inferential analysis of the corresponding words.

10. The method of claim 1, wherein generating modifications to a population language model associated with the cluster of users comprises adding words or n-grams to the population language model or removing words or n-grams from the population language model.

11. The method of claim 1, wherein generating modifications to a population language model associated with the cluster comprises modifying weighting of words or n-grams in the population language model.

12. The method of claim 1, wherein providing generated modifications to the computing device of one or more users in the cluster further comprises providing the associated population language model to a computing device of a user that is newly identified as having a connection to the cluster.

13. The method of claim 1, wherein providing generated modifications to a computing device of one or more users in the cluster comprises providing updates to a local population language model in a computing device of a user.

14. The method of claim 1, wherein aggregating the events to identify modifications to the population model comprises prioritizing events based on frequency of event.

15. The method of claim 1, wherein providing the generated modifications comprises prioritizing modifications by:
determining that a modification is of high importance; and
selectively providing the high-importance modification to the computing device of one or more users in the cluster.

16. A non-transitory computer-readable memory containing instructions that, when executed by a computing system, implement a method of selectively updating local language models used to predictively complete user input, the method comprising:
receiving information about local language models including a first local language model and other local language models, wherein the information about local language models includes information about local language model events representing user changes to at least one of the local language models;
receiving information characterizing users associated with the user changes,
wherein the information includes social-networking friend data for the users;
identifying a user cluster from the received characterization information,
wherein the user cluster is for representing a subset of users sharing matching or associated instances of the social-networking friend data;
identifying a set of the local language models including the first local language model and one or more other local language models, based at least in part on the other local language models having local language model events similar to first local language model events;
for each local language model in the set, identifying additional local language model events;
generating modifications to the first local language model using the additional local language model event information of one or more of the identified other local language models in the set, and also using the user cluster, wherein the generation of the modifications is initiated based on receiving the local language model events;
filtering the generated modifications by excluding events associated with a blacklist of vocabulary not to be added or events associated with a whitelist of vocabulary not to be deleted before updating the first local language model with the generated modifications; and updating the first local language model with the generated modifications based on providing the generated modifications to a computing device of one or more users in the user cluster.

17. The non-transitory computer-readable memory of claim 16, wherein receiving information about local language models comprises receiving a change log, local language models, or a combination thereof.

18. The non-transitory computer-readable memory of claim 16, wherein generating the modifications includes generating the modifications based on other words connected to or inferred from words corresponding to the local language model events, wherein the other words are determined based on word-association for the words corresponding to the local language model events or based on an inferential analysis of the corresponding words.

19. The non-transitory computer-readable memory of claim 16, wherein information about local language model events comprises information about addition of words to the local language model or deletion of words from the local language model.

20. The non-transitory computer-readable memory of claim 19, wherein information about word usage includes frequencies of individual words, word pairs (bigrams), triplets (trigrams), or higher-order n-grams.

21. The non-transitory computer-readable memory of claim 16, wherein updating the first local language model with the generated modifications comprises prioritizing modifications by:
  determining that a modification is of high importance; and
  selectively providing the high-importance modification to the first local language model.

\* \* \* \* \*